US009500312B2

(12) United States Patent
Chang

(10) Patent No.: US 9,500,312 B2
(45) Date of Patent: Nov. 22, 2016

(54) 3D IMAGE PHOTOGRAPHING DEVICE

(71) Applicant: Yu-Cheng Chang, Kaohsiung (TW)

(72) Inventor: Yu-Cheng Chang, Kaohsiung (TW)

(*) Notice: Subject to any disclaimer, the term of this patent is extended or adjusted under 35 U.S.C. 154(b) by 99 days.

(21) Appl. No.: 14/555,970

(22) Filed: Nov. 28, 2014

(65) Prior Publication Data

US 2015/0144759 A1 May 28, 2015

(30) Foreign Application Priority Data

Nov. 28, 2013 (TW) .............................. 102143523 A

(51) Int. Cl.
| F16M 11/04 | (2006.01) |
| F16M 11/06 | (2006.01) |
| H04N 13/00 | (2006.01) |
| F16M 11/18 | (2006.01) |
| F16M 11/20 | (2006.01) |
| F16M 11/42 | (2006.01) |
| G03B 17/56 | (2006.01) |
| G03B 35/02 | (2006.01) |

(52) U.S. Cl.
CPC .......... *F16M 11/043* (2013.01); *F16M 11/048* (2013.01); *F16M 11/06* (2013.01); *F16M 11/18* (2013.01); *F16M 11/2014* (2013.01); *F16M 11/425* (2013.01); *G03B 17/561* (2013.01); *G03B 35/02* (2013.01); *H04N 13/00* (2013.01)

(58) Field of Classification Search
CPC .. F16M 11/043; F16M 11/048; F16M 11/06; F16M 11/18; F16M 11/2014; F16M 11/425; G03B 17/561; G03B 35/00; H04N 13/00
USPC .......... 248/346.06, 123.1, 371, 284.1, 184.1, 248/187.1; 396/338, 428, 429; 348/373, 348/374; 104/307; 352/243
See application file for complete search history.

(56) References Cited

U.S. PATENT DOCUMENTS

| 2,386,276 | A | * | 10/1945 | Simjian | ................ G03B 19/023 396/429 |
| 3,495,545 | A | * | 2/1970 | Radovic | ............... B65G 17/485 104/89 |
| 3,613,546 | A | * | 10/1971 | Richardson | ............ F16M 11/42 396/428 |
| 8,973,505 | B2 | * | 3/2015 | Hurd | ...................... F16M 11/18 396/428 |
| 2005/0231689 | A1 | * | 10/2005 | Longley | ................. F16M 11/42 352/243 |
| 2007/0095246 | A1 | * | 5/2007 | Heiligenmann | ....... F16M 11/42 104/307 |
| 2015/0144759 | A1 | * | 5/2015 | Chang | .................. F16M 11/048 248/346.06 |

FOREIGN PATENT DOCUMENTS

| CN | 102809893 A | 12/2012 |
| CN | 203191679 U | 9/2013 |
| JP | 411094192 A | * 4/1999 |

* cited by examiner

*Primary Examiner* — Tan Le
(74) *Attorney, Agent, or Firm* — Alan D. Kamrath; Kamrath IP Lawfirm, P.A.

(57) ABSTRACT

A 3d image photographing device produces a 3D image with an enhanced stereoscopic effect. The device includes a first track, a second track, a slide carriage and a driving module. The first track couples with the second track. The first track includes a first slideway in an arc shape. The second track includes a second slideway in an arc shape, and a curvature of the second slideway is larger than a curvature of the first slideway. The slide carriage includes a base. A first sliding block is rotatably mounted to a surface of the base, and a groove is arranged on the surface. The first sliding block movably coupled to the second slideway. A positioning member couples with the groove, with the positioning member having a second sliding block movably coupled to the first slideway, and with the second sliding block connecting with a blocking portion received in the groove. A coupling portion is mounted to another surface of the base for coupling a camera.

11 Claims, 7 Drawing Sheets

3D IMAGE PHOTOGRAPHING DEVICE

BACKGROUND OF THE INVENTION

1. Field of the Invention

The present invention relates to a 3D image photographing device and, more particularly, to a 3D image photographing device providing two tracks for coupling a camera to produce a 3D image.

2. Description of the Related Art

FIG. 1 is a schematic view of a conventional 3D image photographing device 9 including a track 91 and a sliding carriage 92. The track 91 has a slideway 911, and the sliding carriage 92 is coupled to the slideway 911. The sliding carriage 92 has a coupling portion 921 for coupling a camera. The sliding carriage 92 is able to slide along the slideway 911. The slideway 911 is in a circular arc shape, and the arc shape of the slideway 911 is normally part of a circle with a diameter between 3 meters to 9 meters. In other words, when the sliding carriage 92 slides along the slideway 911, the coupling portion 921 will move along a path having a curvature equal to the curvature of the slideway 911.

In use of the conventional 3D image photographing device 9, a camera is coupled to the coupling portion 921 of the sliding carriage 92, and the sliding carriage 92 is driven to slide from an end of the slideway 911 toward another end thereof. Thus, the camera can take images of an object from different visual angles by shooting along the path in the arc shape, and the images taken from different visual angles can be synthesized to obtain a three dimensional (3D) image by postproduction software. By applying refraction of grating, such as looking at the 3D image through a lenticular diffraction grating, the 3D image can produce visual illusion, and the user tends to gain a stereoscopic effect from the 3D image.

A traditional 3D image is produced by a plurality of manual work steps, including layering, retouching, outlining, etc. Therefore, the conventional 3D image photographing device 9 can produce a 3D image with a shorter time and a lower labor cost. However, the application of the conventional 3D image photographing device 9 is not popular, because the conventional 3D image photographing device 9 can only take clear images of the object located at a single position. Specifically, since the slideway 911 is in the circular arc shape which is part of the circle, the camera keeps focusing on a center of the circle when the camera slides along the slideway 911. Thus, the 3D image produced by the conventional 3D image photographing device 9 only acquires a clear view at the center of the circle. Namely, the conventional 3D image photographing device 9 is incapable of taking clear images of the object at different positions. Any object located away from the center will be out of focus in the 3D image, and, thus, it is difficult to obtain stereoscopic effect from the 3D image.

Moreover, when a distance "D" between the conventional 3D image photographing device 9 and an object to be shot is long, a slideway 911 with a smaller curvature, namely the circular arc shape of the slideway 911 being part of a circle with a larger diameter, is needed. However, the slideway 911 with a smaller curvature will cause the images, that are taken by a camera sliding along the slideway 911, to have similar visual angles. Thus, the slideway 911 has to be long enough in order to obtain a 3D image with satisfactory stereoscopic effect. In fact, if the circular arc shape of the slideway 911 is part of a circle with a diameter of 6 meters, the slideway 911 is normally longer than 1 meter to make sure a radian measure of the images is effectively enlarged. Thus, the size and cost of the conventional 3D image photographing device 9 is high, since the length of slideway 911 is too long. Besides, although a prolonged slideway 911 can increase variation in visual angles of images taken by the camera sliding along the slideway 911, the boundary visual angles of the images will increase accordingly. Thus, the images taken by the camera have a problem of a medium shot offset. An image alignment process is required to correct the medium shot offset, which increases the cost in producing a 3D image.

Furthermore, referring to FIG. 2, the slideway 911 is in the circular arc shape, such that the images taken by a camera coupled to the slideway 911 have a large background offset "d." Thus, the background of a 3D image obtained from the image will be out of focus. The background offset "d" is particularly large when the length of slideway 911 is long, which leads the 3D image to have a clear object but a fuzzy background, and the performance of the conventional 3D image photographing device 9 is, thus, unsatisfactory.

In view of the foregoing and since the conventional 3D image photographing device 9 has disadvantages, such as the incapability to take clear images of the object at different positions, the difficulty in obtaining a 3D image with a satisfactory stereoscopic effect and a clear background, and the high image production cost as mentioned above, improvement to the conventional 3D image photographing device 9 is necessary.

SUMMARY OF THE INVENTION

An objective of the present invention is to provide a 3D image photographing device including a first track with a first slideway and a second track with a second slideway. A slide carriage respectively couples with the first track and the second track, allowing a camera coupled to the slide carriage to move along a path having a curvature larger than the curvature of the first slideway when the slide carriage slides along the first track and the second track. Thus, the camera can take clear images of the objects located at an entire region, improving the utility of the 3D image photographing device.

Another objective of the present invention is to provide a 3D image photographing device in which the curvature difference between the first slideway and the second slideway is used to increase the variation in visual angles of images taken by the camera coupled to the slide carriage, allowing a radian measure of these images to be effectively enlarged to obtain a 3D image with enhanced stereoscopic effect. Therefore, the required lengths of the first track and the second track are limited, and image production cost is, thus, lowered.

A further objective of the present invention is to provide a 3D image photographing device in which the second track forces the slide carriage to move close to or away from the first track, such that images taken by a camera coupled to the coupling portion are centralized. Therefore, the background offset of the images is limited, and a 3D image obtained from the images will have a clear background, thereby enhancing the image quality.

The present invention fulfills the above objectives by providing a 3D image photographing device including a first track, a second track, a slide carriage and a driving module. The first track includes a first assembly portion and a first slideway. The first slideway is in an arc shape. The second track includes a second assembly portion and a second slideway. The first track couples with the second track through the first assembly portion and the second assembly portion. The second slideway is in an arc shape, and a curvature of the second slideway is larger than a curvature of the first slideway. The slide carriage includes a base, a first sliding block, a groove, a positioning member and a coupling portion. The first sliding block is rotatably mounted to a surface of the base and the groove is arranged on the surface. The first sliding block is movably coupled to the second slideway. The positioning member couples with the groove. The positioning member has a second sliding block movably coupled to the first slideway. The second sliding block connects with a blocking portion received in the groove. The coupling portion is mounted to another surface of the base for coupling a camera. The driving module is coupled to the base. The driving module includes a power device for driving the base to shift.

In an embodiment of the 3D image photographing device according to the present invention, the first assembly portion and the second assembly portion are a pair of detachable engagement structures corresponding to each other. The first track detachably couples with the second track through the first assembly portion and the second assembly portion.

In the above embodiment of the 3D image photographing device, the first slideway is in a circular arc shape, and the second slideway is also in a circular arc shape.

In the above embodiment of the 3D image photographing device, the circular arc shape of the first slideway is part of a circle with a first diameter, and the circular arc shape of the second slideway is part of another circle with a second diameter smaller than the first diameter.

In the above embodiment of the 3D image photographing device, an intrados of the second slideway faces an extrados of the first slideway, and two ends of the second slideway are respectively aligned with the two ends of the first slideway.

In the above embodiment of the 3D image photographing device, the groove extends from the first track toward the second track.

In the above embodiment of the 3D image photographing device, the first track further includes two directing devices mounted to two ends of the first track, respectively.

In the above embodiment of the 3D image photographing device, the circular arc shape of the first slideway is part of a circle, and the two directing devices are laser pointers for projecting laser beams toward a center of the circle.

In the above embodiment of the 3D image photographing device, the positioning member further has a buffer member mounted around the blocking portion.

In the above embodiment of the 3D image photographing device, the power device is a variable speed motor.

In the above embodiment of the 3D image photographing device, the driving module further includes a screw rod and a screw sleeve. The power device couples with the screw rod, and the screw sleeve is screwed on the screw rod and couples with the base.

In accordance with the above structure, by providing the first track to control shooting angles of a camera, and by providing a second track to limit the background offset of images taken by the camera, the 3D image photographing device according to the present invention can improve utility of the 3D image photographing device, can obtain a 3D image with an enhanced stereoscopic effect, lower image production cost, and can enhance the image quality.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

DETAILED DESCRIPTION OF THE INVENTION

Figure 3:
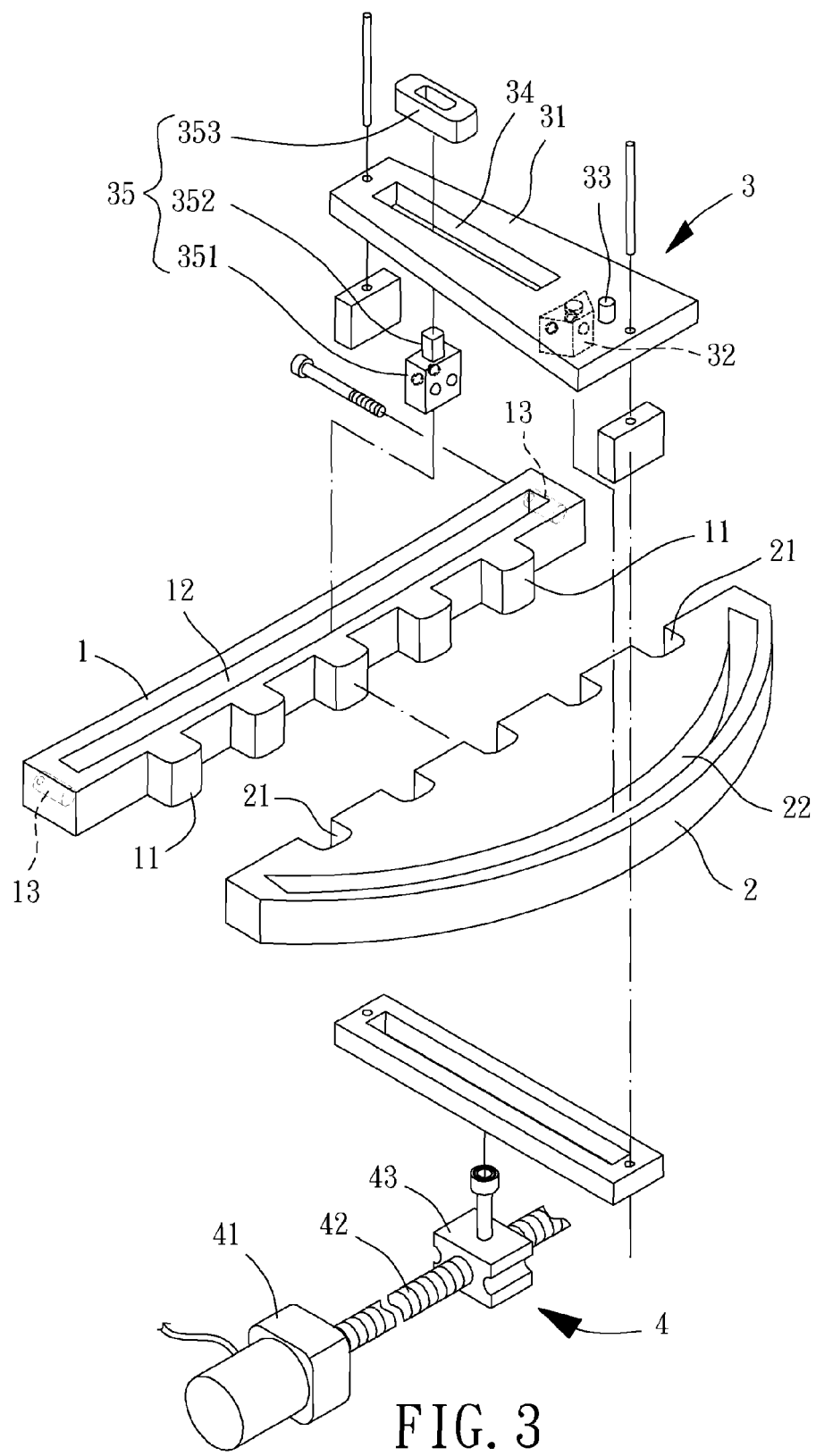
FIG. 3 is a schematic, exploded view of a 3D image photographing device of an embodiment according to the present invention.

FIG. 3 is a perspective view of a 3D image photographing device of an embodiment according to the present invention. The 3D image photographing device includes a first track 1, a second track 2, a slide carriage 3 and a driving module 4. The first track 1 couples with the second track 2, the slide carriage 3 respectively couples with the first track 1 and the second track 2, and the driving module 4 is coupled to the slide carriage 3. The first track 1 has a first assembly portion 11, and the second track 2 has a second assembly portion 21. The first assembly portion 11 and the second assembly portion 21 are a pair of detachable engagement structures corresponding to each other, so that the first track 1 is able to detachably couple with the second track 2 through the first and second assembly portions 11, 21. Specifically, the first and second assembly portions 11, 21 may be a tenon and a mortise corresponding to each other for making an interlocking joint between the first and second assembly portions 11, 21. Alternatively, the first and second assembly portions 11, 21 may be a pair of through holes aligning with each other in which a fixing element can be provided to extend through the first and second assembly portions 11, 21 to couple the first assembly portion 11 and the second assembly portion 21 with each other.

In fact, since the first track 1 and the second track 2 can respectively couple with a platform for retaining purposes, it is not necessary for the first and second assembly portions 11, 21 to be coupled to each other. Therefore, the first and second assembly portions 11, 21 may also be two surfaces abutting against each other instead of coupling with each other, so that the first and second assembly portions 11, 21 can simply provide a positioning effect without being coupled to each other.

The first track 1 includes a first slideway 12 and two directing devices 13. The first slideway 12 extends between two ends of the first track 1, and the two directing devices 13 are mounted to the two ends of the first track 1, respectively. The first slideway 12 is in an arc shape, and the first slideway 12 can be in a circular arc shape. In this embodiment, the first slideway 12 is in a circular arc shape which is part of a circle with a diameter between 3 meters to 9 meters. In other words, the circular arc shape of the first slideway 12 can be extended to form the circle with the diameter between 3 meters to 9 meters. The two directing devices 13 can be laser pointers for projecting laser beams toward a center of the circle.

The second track 2 includes a second slideway 22. The second slideway 22 extends between two ends of the second track 2. The second slideway 22 is also in an arc shape, and the second slideway 22 can also be in a circular arc shape. An intrados of the second slideway 22 faces an extrados of the first slideway 12, and two ends of the second slideway 22 are respectively aligned with the two ends of the first slideway 12. A curvature of the second slideway 22 is larger than a curvature of the first slideway 12. Namely, if the first slideway 12 and the second slideway 22 are both in circular arc shapes, the circular arc shape of the first slideway 12 is part of a circle with a first diameter, and the circular arc shape of the second slideway 22 is part of another circle with a second diameter smaller than the first diameter. In this embodiment, the second slideway 22 is in a circular arc shape which is part of a circle with a diameter between 30 centimeters to 70 centimeters.

The slide carriage 3 includes a base 31 and a first sliding block 32 rotatably mounted to a surface of the base 31. The first sliding block 32 is movably coupled to the second slideway 22 of the second track 2, so that the first sliding block 32 is able to slide along the second slideway 22. A coupling portion 33 is mounted to another surface of the base 31 for coupling a camera. The camera described herein may be a digital single-lens reflex (DSLR) camera, a mirrorless interchangeable-lens camera (MILC), a digital video recorder, a cell phone or other products with digital photographing function. The slide carriage 3 further includes a groove 34 arranged on the surface of the base 31 with the first sliding block 32. The groove 34 can extend from the first track 1 toward the second track 2, and a positioning member 35 couples with the groove 34. Specifically, the positioning member 35 has a second sliding block 351 movably coupled to the first slideway 12 of the first track 1, so that the second sliding block 351 is able to slide along the first slideway 12. The second sliding block 351 connects with a blocking portion 352 received in the groove 34. The blocking portion 352 may be a pillar penetrating into the groove 34, such that the groove 34 can slide relative to the blocking portion 352. The positioning member 35 can have a buffer member 353 mounted around the blocking portion 352. The buffer member 353 is made of rubber or other damping material. Thus, the buffer member 353 can reduce vibration caused by contact between the blocking portion 352 and the groove 34.

With the first sliding block 32 rotatably mounted to the surface of the base 31, the base 31 is able to rotate about the first sliding block 32. Thus, since the coupling portion 33 is mounted to the other surface of the base 31, the first track 1 can control shooting angles of a camera coupled to the coupling portion 33. Specifically, with the first sliding block 32 movably coupled to the second slideway 22 of the second track 2, when the slide carriage 3 slides along the first track 1 and the second track 2, an angle between the first sliding block 32 and the base 31 is constantly changing because the base 31 can rotate about the first sliding block 32. Accordingly, the second track 2 will not affect shooting angles of the camera coupled to the coupling portion 33, so that the camera angles are controlled by the first track 1.

With the blocking portion 352 of the positioning member 35 received in the groove 34, the groove 34 can slide relative to the blocking portion 352. Since the groove 34 extends from the first track 1 toward the second track 2, and assuming a longitudinal direction extends from the first track 1 toward the second track 2, the second track 2 can control the position of the slide carriage 3 on the longitudinal direction. Specifically, with the second sliding block 351 of the positioning member 35 movably coupled to the first slideway 12 of the first track 1, when the slide carriage 3 slides along the first track 1 and the second track 2, the position of the slide carriage 3 on the longitudinal direction relative to the first track 1 is constantly changing because the groove 34 can slide relative to the blocking portion 352. On the contrary, the position of the slide carriage 3 on the longitudinal direction relative to the second track 2 is fixed since the base 31 cannot slide relative to the first sliding block 32. Therefore, the first track 1 will not affect the position of the slide carriage 3 on the longitudinal direction, so that the position of the slide carriage 3 on the longitudinal is controlled by the second track 2.

The driving module 4 is coupled to the base 31 of the slide carriage 3. The driving module 4 is able to drive the base 31 to shift, such that the slide carriage 3 is driven to slide along the first track 1 and the second track 2. The driving module 4 includes a power device 41, and the power device 41 can be a variable speed motor. In this embodiment, the driving module 4 further includes a screw rod 42 and a screw sleeve 43. The power device 41 couples with the screw rod 42. The screw sleeve 43 is screwed on the screw rod 42 and couples with the base 31. In accordance with the above structure, the power device 41 can drive the screw rod 42 to rotate, so that the screw sleeve 43 can move along the screw rod 42, thus driving the base 31 to shift. However, the power device 41 may also drive the base 31 to shift through a belt and pulley, a gear and gear rack or another transmission configuration. The present invention is not limited to these.

Figure 4:
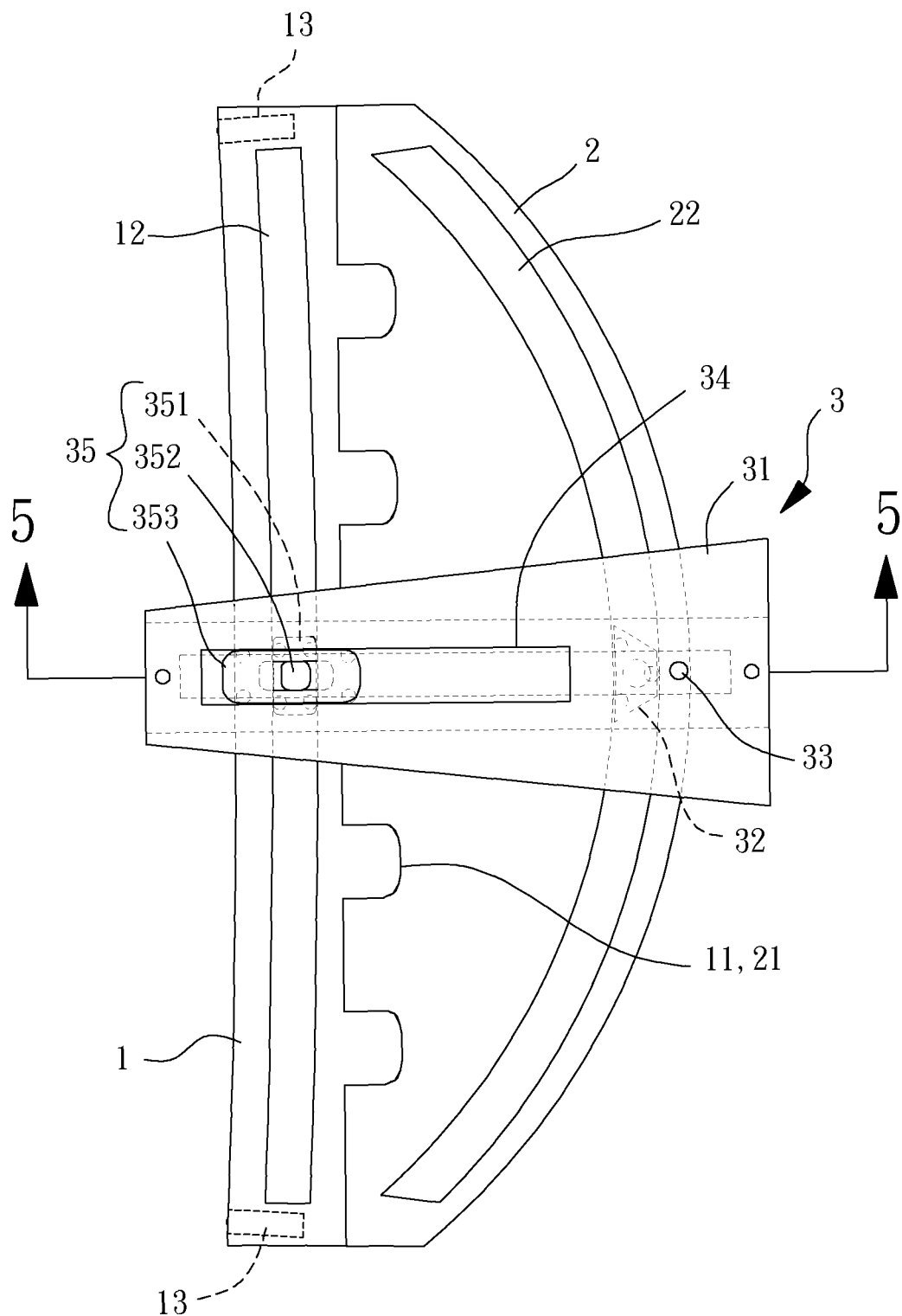
FIG. 4 is schematic, perspective view of the 3D image photographing device of the embodiment according to the present invention.
Figure 5:
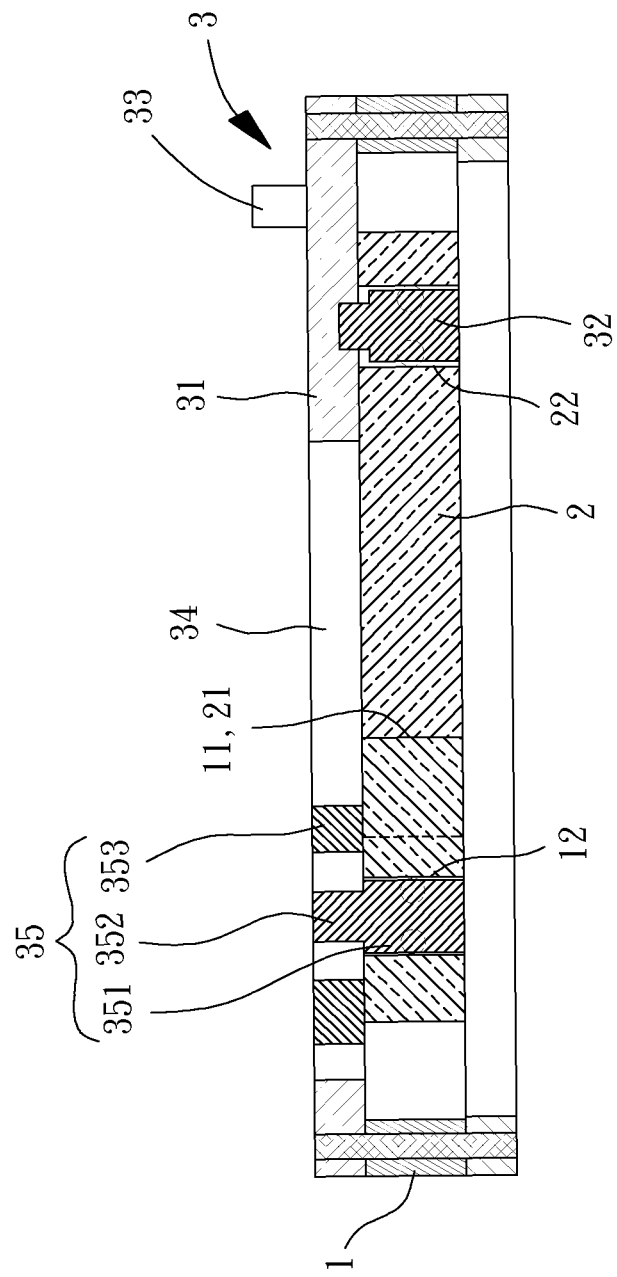
FIG. 5 is an enlarged, cross sectional view illustrating a slide carriage of the 3D image photographing device of the embodiment according to the present invention.

Referring to FIGS. 4 and 5, when the slide carriage 3 is located at a center position of the first and second tracks 1, 2, and since the spacing between the first slideway 12 and the second slideway 22 is large, the blocking portion 352 of the positioning member 35 is located at a side of the groove 34 adjacent to the first track 1. Relatively, when the slide carriage 3 is driven by the driving module 4 to slide toward two ends of the first and second tracks 1, 2, and since the spacing between the first slideway 12 and the second slideway 22 is decreasing, the base 31 of the slide carriage 3 will move close to the first track 1, and the groove 34 will slide relative to the blocking portion 352. Thus, the blocking portion 352 becomes located at another side of the groove 34 adjacent to the second track 2.

Therefore, the slide carriage 3 respectively couples with the first track 1 and the second track 2, and the slide carriage 3 is driven to slide along the first track 1 and the second track 2. Since the curvature of the second slideway 22 is different from the curvature of the first slideway 12, when the slide carriage 3 slides along the first track 1 and the second track 2, the second track 2 can force the slide carriage 3 to move close to or away from the first track 1. Thus, the coupling portion 33 mounted to the base 31 can move along a path having a curvature larger than the curvature of the first slideway 12.

Figure 6:
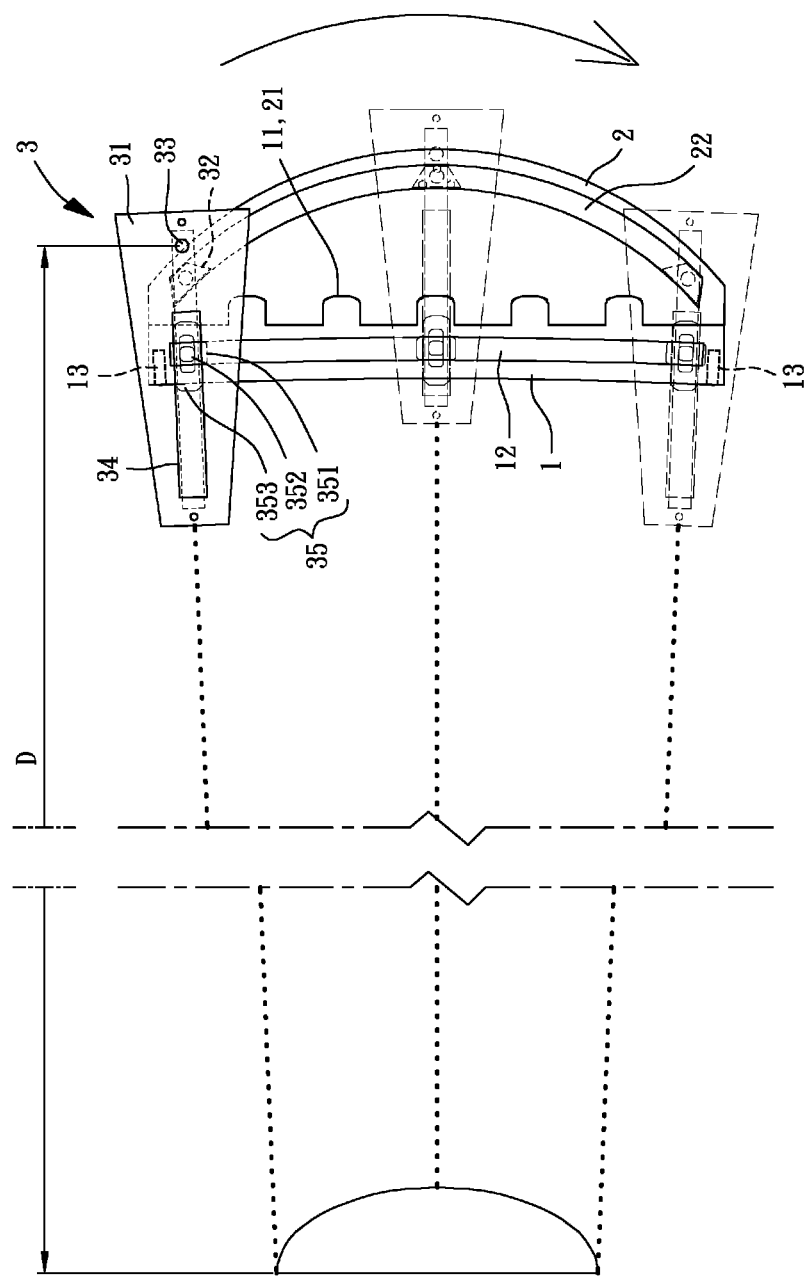
FIG. 6 is a schematic, perspective view illustrating a shooting angle of the 3D image photographing device of the embodiment according to the present invention.

Referring to FIG. 6, in use of the 3D image photographing device of the embodiment according to the present invention, a plurality of first tracks 1 can be prepared, with each first track 1 including a first slideway 12 with a different curvature. A first track 1 including a first slideway 12 with a specific curvature is selected according to a distance "D" between the 3D image photographing device and an object to be shot. For example, if the distance "D" is 3 meters, a first track 1 including a first slideway 12 in a circular arc shape which is part of a circle with 3 meters diameter can be selected. Once the first track 1 is selected, the first track 1 is coupled to the second track 2 through the first and second assembly portions 11, 21. A camera is coupled to the coupling portion 33 of the slide carriage 3, and the slide carriage 3 is fixed to an end of the first and second tracks 1, 2. Thereby, the driving module 4 may drive the slide carriage 3 to slide toward another end of the first and second tracks 1, 2, and the camera continues to take images at the same time. Thus, the camera can take images of an object from different visual angles by equidistance shooting, and the images taken from different visual angles can be synthesized to obtain a 3D image by postproduction software. In this embodiment, during the slide carriage 3 sliding from an end to another end of the first and second tracks 1, 2, the camera can take 20 to 30 images of the object, so that the number of the images is large enough so that the synthesized 3D image can have fine image quality. Meanwhile, the number of the images is small enough so that the data is not in a large quantity and will not cause any difficulty in processing the data.

Note that the power device 41 of the driving module 4 can be a variable speed motor. In this embodiment, with the power device 41 being a variable speed motor, the 3D image photographing device is adapted for different brands, types or models of cameras. Specifically, since there is a difference in the shooting frequency between different cameras, the power device 41 must be able to adjust the velocity of the slide carriage 3 sliding along the first and second tracks 1, 2 in order for different cameras to take the same number of images when the slide carriage 3 slides from an end to another end of the first and second tracks 1, 2. Therefore, with the power device 41 being a variable speed motor, the 3D image photographing device is adapted for different cameras because the same number of images can be taken by different cameras to obtain a 3D image.

Figure 7:
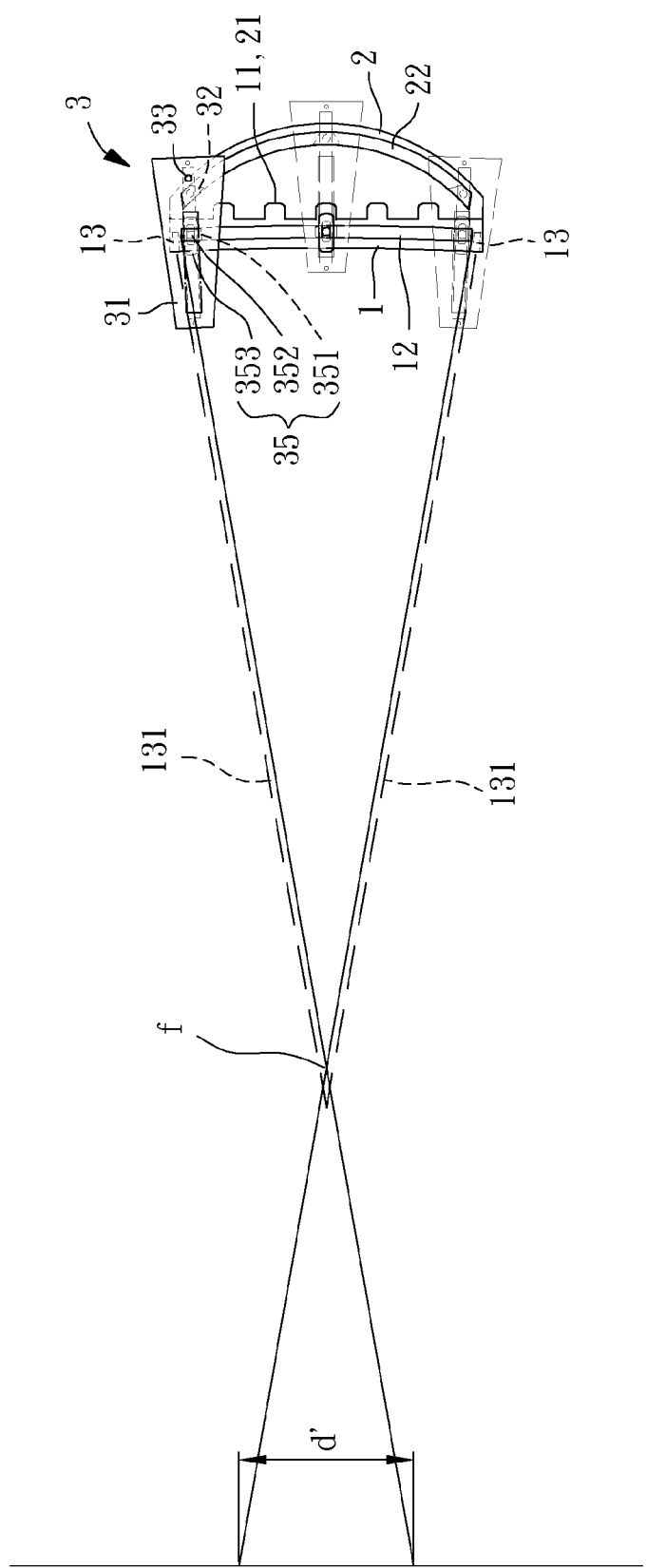
FIG. 7 is a schematic, perspective view illustrating a background offset of the 3D image photographing device of the embodiment according to the present invention.

On the other hand, referring to FIG. 7, the two directing devices 13 of the first track 1 can respectively project a laser beam 131 toward a focus "f." Namely, if the first slideway 12 is in a circular arc shape which is part of a circle, the focus "f" is a center of the circle. By such an arrangement, the user can identify the focusing position of the camera through the two directing devices 13. The 3D image photographing device of the embodiment can take clear images of an object to be shot as long as the object is placed adjacent to the focus "f."

Consequently, the 3D image photographing device of the present disclosure is characterized as follows.

With the curvature of the second slideway 22 being different from the curvature of the first slideway 12, and when the slide carriage 3 slides along the first track 1 and the second track 2, the second track 2 can force the slide carriage 3 to move close to or away from the first track 1. Thus, the coupling portion 33 mounted to the base 31 can move along a path having a curvature larger than the curvature of the first slideway 12. As compared to the conventional 3D image photographing device 9 where the object can only be clearly rendered in a certain position due to the fact that the camera keeps focusing on the center of the circle when sliding along the slideway 911, the 3D image photographing device of the embodiment according to the present invention can shift the focusing position of a camera when the camera slides along the first and second tracks 1, 2. Therefore, the conventional 3D image photographing device 9 only takes clear images of the object located at a single position, namely the center of the circle. Comparatively, the 3D image photographing device of the embodiment can take clear images of objects located at an entire region, thus, practically improving utility of the 3D image photographing device.

Figure 1:
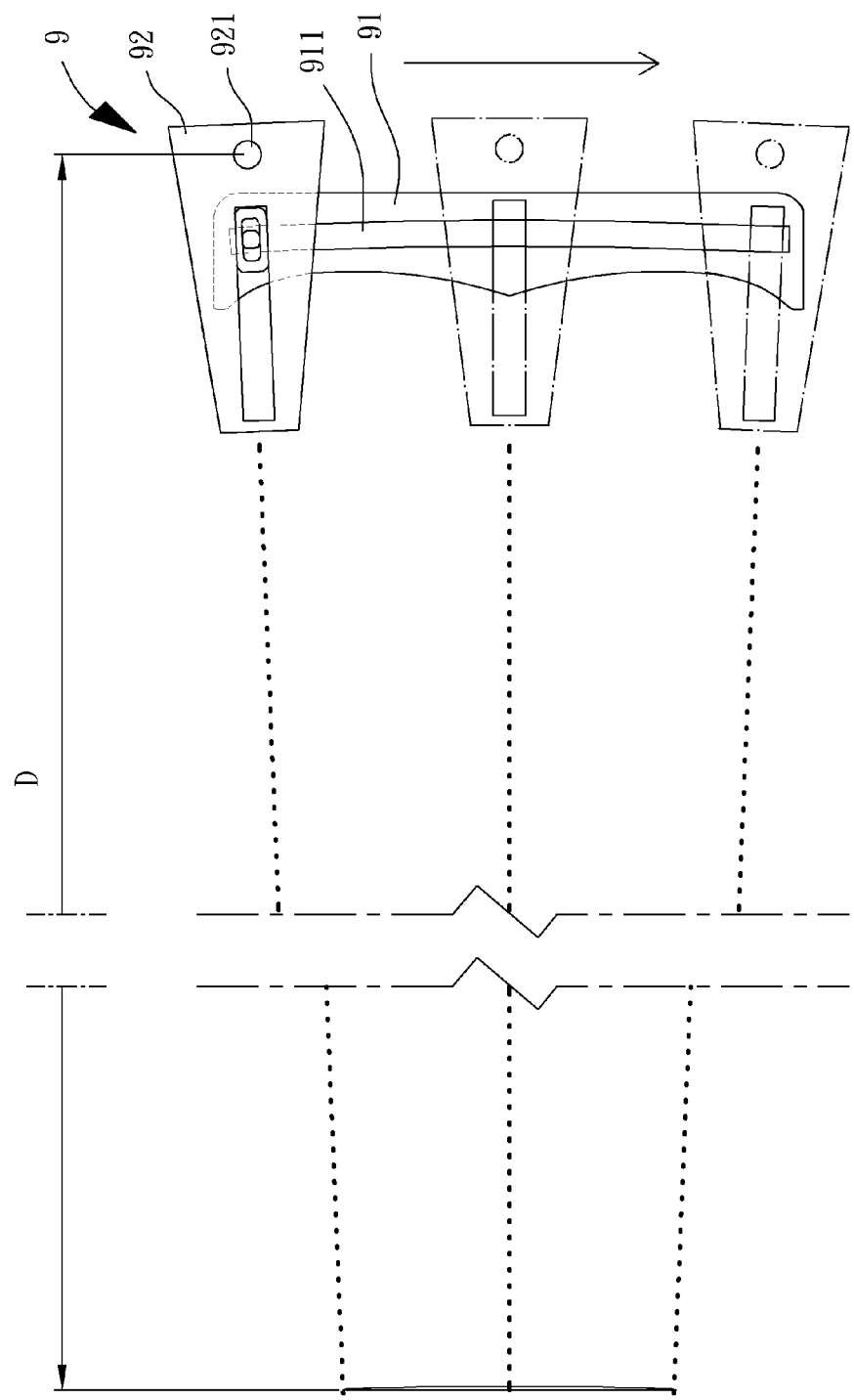
FIG. 1 is a schematic, perspective view illustrating a shooting angle of a conventional 3D image photographing device.

Moreover, referring to FIGS. 1 and 6, consider that the conventional 3D image photographing device 9 and the 3D image photographing device of the embodiment are used to take images of an object, with distances "D" between the object and both 3D image photographing devices being the same. For the conventional 3D image photographing device 9, since the slideway 911 is in the circular arc shape, images taken by a camera sliding along the slideway 911 have similar visual angles. Thus, the slideway 911 have to be long enough in order to obtain a 3D image with satisfactory stereoscopic effect. However, for the 3D image photographing device of the embodiment, the curvature difference between the first slideway 12 and the second slideway 22 is used to increase the variation in visual angles of the images taken by a camera sliding along the first and second slideways 12, 22. Thus, a radian measure of these images can be effectively enlarged to obtain a 3D image with an enhanced stereoscopic effect.

Specifically, when the slide carriage 3 is located at a center position of the first and second tracks 1, 2, a distance between the camera and the object is actually longer than the distance "D," thus an image taken by the camera is smaller. On the contrary, when the slide carriage 3 is located at two ends of the first and second tracks 1, 2, another distance between the camera and the object is smaller or equal to the distance "D," thus another image taken by the camera is larger. Accordingly, since the sizes of images taken by the camera are different, a radian measure of these images is effectively enlarged by the 3D image photographing device of the embodiment. Therefore, a 3D image with enhanced stereoscopic effect can be obtained, so that the required lengths of the first track 1 and the second track 2 are smaller. In this embodiment, the lengths of the first track 1 and the second track 2 are both within 50 centimeters. Compared to the conventional 3D image photographing device 9 in which the length of the track 91 is normally lager larger than 1 meter or more, the first track 1 and the second track 2 of the 3D image photographing device of the embodiment can effectively reduce the size and cost of the 3D image photographing device due to the reduction of the lengths thereof. Besides, the first track 1 and the second track 2 can limit the boundary visual angles of images taken by the camera. Thus, medium shot offset can be avoided and it is not necessary to apply an image alignment process to the images. In view of the forgoing, the 3D image photographing device of the embodiment can lower the image production cost.

Figure 2:
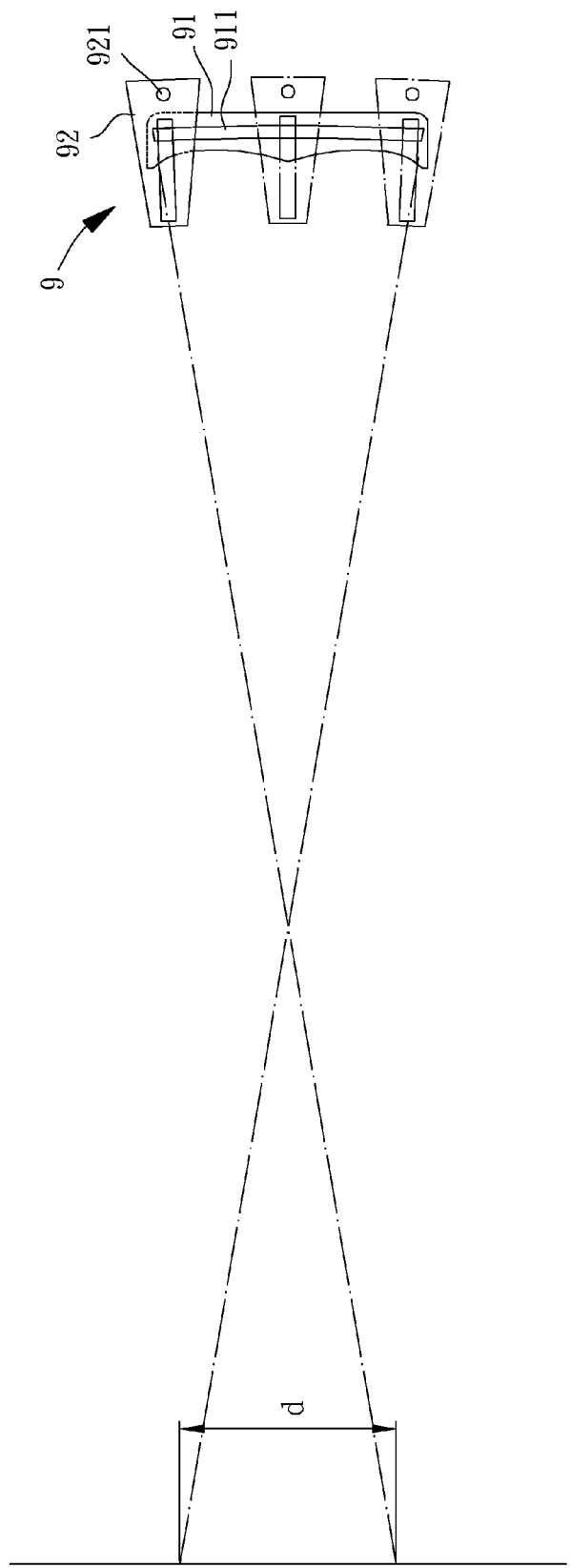
FIG. 2 is a schematic, perspective view illustrating a background offset of the conventional 3D image photographing device.

Furthermore, referring to FIGS. 2 and 7, in this embodiment, when the slide carriage 3 slides along the first track 1 and the second track 2, the second track 2 can force the slide carriage 3 to move close to or away from the first track 1. Thus, the coupling portion 33 mounted to the base 31 can move along a path having a curvature larger than the curvature of the first slideway 12, and the images taken by a camera coupled to the coupling portion 33 are centralized, thereby effectively limiting a background offset "d" of the images. Compared to the conventional 3D image photographing device 9 in which the slideway 911 is in the circular arc shape such that the images taken by a camera coupled to the slideway 911 has a large background offset "d," the 3D image photographing device of the embodiment can reduce the background offset of images. Thus, with the relatively smaller background offset "d'," a 3D image obtained from the images taken by a camera coupled to the coupling portion 33 will have a clear background, which enhances the image quality. It should be noted that since the position of the slide carriage 3 on the longitudinal is controlled by the second track 2, the background offset "d" of the images is limited by the second track 2.

In sum, by providing the first track 1 to control the shooting angles of a camera and by providing a second track 2 to limit the background offset of images taken by the camera, the 3D image photographing device according to the present invention can improve utility of the 3D image photographing device, can obtain a 3D image with enhanced stereoscopic effect, can lower the image production cost, and can enhance the image quality.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A 3D image photographing device comprising:
   a first track including a first assembly portion and a first slideway, wherein the first slideway is in an arc shape;
   a second track including a second assembly portion and a second slideway, wherein the first track couples with the second track through the first assembly portion and the second assembly portion, wherein the second slideway is in an arc shape, and wherein a curvature of the second slideway is larger than a curvature of the first slideway;
   a slide carriage including a base, wherein a first sliding block is rotatably mounted to a surface of the base and a groove arranged on the surface, wherein the first sliding block is movably coupled to the second slideway, wherein a positioning member couples with the groove, wherein the positioning member has a second sliding block movably coupled to the first slideway, wherein the second sliding block connects with a blocking portion received in the groove, and wherein a coupling portion is mounted to another surface of the base for coupling a camera; and
   a driving module coupled to the base, wherein the driving module includes a power device for driving the base to shift.

2. The 3D image photographing device as claimed in claim 1, wherein the first assembly portion and the second assembly portion are a pair of detachable engagement structures corresponding to each other, and wherein the first track detachably couples with the second track through the first assembly portion and the second assembly portion.

3. The 3D image photographing device as claimed in claim 1, wherein the first slideway is in a circular arc shape, and wherein the second slideway is also in a circular arc shape.

4. The 3D image photographing device as claimed in claim 3, wherein the circular arc shape of the first slideway is part of a circle with a first diameter, and wherein the circular arc shape of the second slideway is part of another circle with a second diameter smaller than the first diameter.

5. The 3D image photographing device as claimed in claim 1, wherein an intrados of the second slideway faces an extrados of the first slideway, and wherein two ends of the second slideway are respectively aligned with the two ends of the first slideway.

6. The 3D image photographing device as claimed in claim 1, wherein the groove extends from the first track toward the second track.

7. The 3D image photographing device as claimed in claim 3, wherein the first track further includes two directing devices mounted to two ends of the first track, respectively.

8. The 3D image photographing device as claimed in claim 7, wherein the circular arc shape of the first slideway is part of a circle, wherein the two directing devices are laser pointers for projecting laser beams toward a centre of the circle.

9. The 3D image photographing device as claimed in claim 1, wherein the positioning member further has a buffer member mounted around the blocking portion.

10. The 3D image photographing device as claimed in claim 1, wherein the power device is a variable speed motor.

11. The 3D image photographing device as claimed in claim 10, wherein the driving module further includes a screw rod and a screw sleeve, wherein the power device couples with the screw rod, and wherein the screw sleeve is screwed on the screw rod and couples with the base.

* * * * *